United States Patent [19]
Hutch

[11] 3,961,203
[45] June 1, 1976

[54] SIGNAL CORRELATOR
[75] Inventor: Frederick Hutch, Warminster, Pa.
[73] Assignee: Honeywell Inc., Minneapolis, Minn.
[22] Filed: Jan. 9, 1975
[21] Appl. No.: 539,857

[52] U.S. Cl. ............................... 307/236; 307/232; 328/109; 328/118; 328/120; 340/146.1 AB
[51] Int. Cl.² .......................................... H03K 5/18
[58] Field of Search ..................... 307/232, 236, 230; 328/57, 109, 118, 119, 120; 340/146.1 AB, 146.1 F, 146.1 BA

[56] References Cited
UNITED STATES PATENTS

| 3,303,462 | 2/1967 | Dotter, Jr. | 340/146.1 AB |
| 3,508,158 | 4/1970 | Marchese | 307/235 A |
| 3,564,287 | 2/1971 | Todd | 307/235 A |
| 3,646,453 | 2/1972 | Garcia | 328/118 |

Primary Examiner—John Zazworsky
Attorney, Agent, or Firm—Laurence J. Marhoefer; Lockwood D. Burton; Mitchell J. Halista

[57] ABSTRACT

A signal correlator for correlating pulse pairs received over a data transmission line as alternating positive and negative pulses representing data "1's" and "O's." The reception of a logic "1" is affirmed by testing for a negative polarity pule pulse an initial positive polarity pulse received over the transmission line. Conversely, the reception of a logic "O" is affirmed by testing for a positive pulse following an initial negative pulse received over the transmission line. The first pulse of a pulse pair received over the transmission line is temporarily stored in a flip-flop and the stored pulse value is compared by a comparator with the second pulse when it arrives. An error signal is developed by the comparator in the event that an error is detected between the stored pulse value and the second pulse with which it is compared in either pulse pair combination.

5 Claims, 2 Drawing Figures

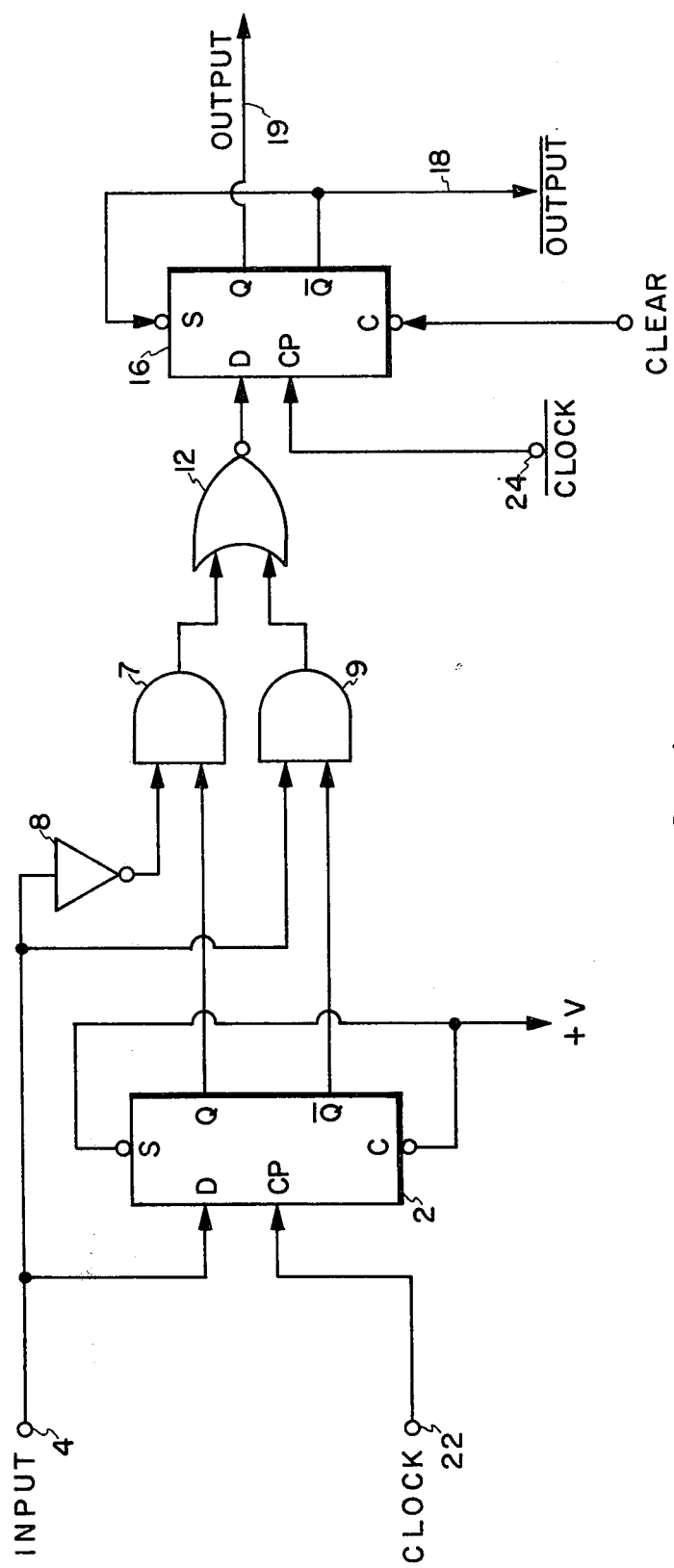
F I G. 1

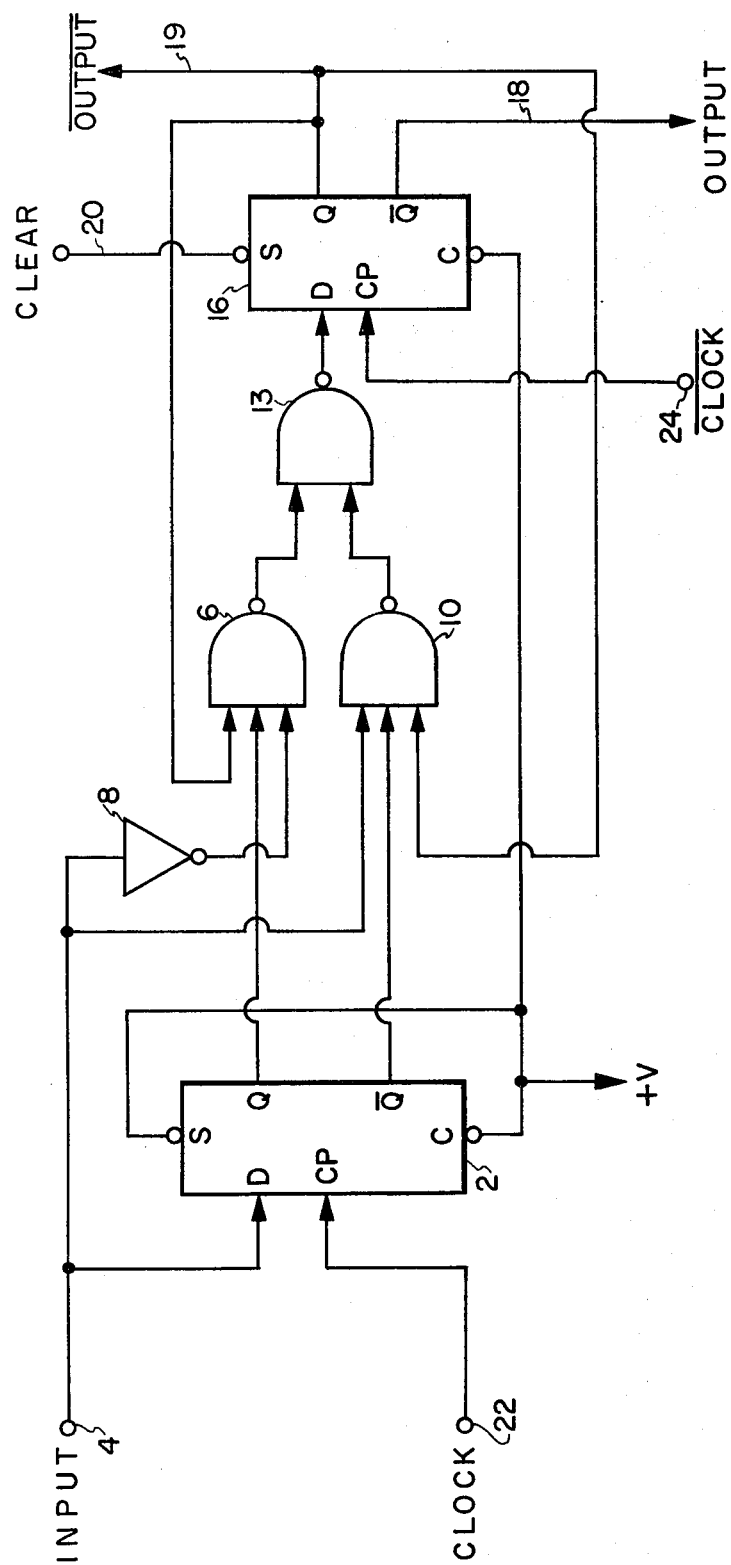
F I G. 2

3,961,203

SIGNAL CORRELATOR

BACKGROUND OF THE INVENTION

Field of the Invention

The present invention is directed to communication receivers. More specifically, the present invention is directed to data signal communication receivers having means for checking the data signals received on a data transmission line.

SUMMARY OF THE INVENTION

An object of the present invention is to provide an improved signal correlator for checking data signals received over a transmission line.

In accomplishing this and other objects, there has been provided, in accordance with the present invention, a pulse checking circuit having a flip-flop for temporarily storing a first data pulse and a comparator circuit for comparing the pulse stored in the flip-flop with a second data pulse received over the data transmission line.

BRIEF DESCRIPTION OF THE DRAWING

A better understanding of the present invention may be had when the following description is read in connection with the accompanying drawing, in which:

FIG. 1 is a block diagram illustration of a signal correlator embodying the present invention, and FIG. 2 is a block diagram of another signal correlator circuit embodying the present invention.

DESCRIPTION OF THE PREFERRED EMBODIMENT

DETAILED DESCRIPTION

Referring to FIG. 1 in more detail, there is shown a signal correlator circuit having a first storage flip-flop 2 with its "D" input connected to a signal input terminal 4. The "Q" output of the flip-flop 2 is connected as one input of a two-input AND gate 7. A logical inverter 8 is connected between the input terminal 4 and a second input of the AND gate 7. A second, or "Q̄", output of the flip-flop 2 is connected to a first input of a second two-input AND gate 9. A second input for a second AND gate 9 is applied directly from the input terminal 4. The output signals from the first and second AND gates 7 and 9 are connected to respective inputs of a two-input NOR gate 12. The output from the NOR gate 12 is connected to the D input of a second flip-flop 16. The Q̄ output of the second flip-flop 16 is connected to an output line 18 and to the "set" input of the second flip-flop 16. The Q output of the second flip-flop 16 is connected to a second output line 19. The "Clear" and "Set" inputs of the first flip-flop 2 are connected to a source of a high level energizing signal +V to provide a fixed signal for those inputs while the Clear input of the second flip-flop 16 is connected to a Clear signal input terminal. The "Clock" input of the first flip-flop 2 is connected to a clock input terminal 22 while the Clock input of the second flip-flop 16 is connected to a second clock input terminal 24. The Clock input terminals 22 and 24 may be connected to any suitable source of opposite polarity clock signals, e.g., opposite sides of a clock signal storage flip-flop.

Referring to FIG. 2, there is shown another signal correlator circuit also embodying the present invention. Similar reference numbers have been used in FIG. 2 for circuit elements corresponding to those shown in FIG. 1. Thus, a storage flip-flop 2 has its D input connected to an input signal terminal 4. The Q output of the flip-flop 2 is connected as one input of a first three-input NAND gate 6. A logical inverter 8 is connected between the input terminal 4 and a second input of the first NAND gate 6. A second, or Q̄, output of the flip-flop 2 is connected to a first input of a second three-input NAND gate 10. A second input for the second NAND gate 10 is applied directly from the input terminal 4. The output signals from the first and second NAND gate 6 and 10 are connected to respective inputs of a two-input NAND gate 3. The output from the NAND gate 3 is connected to the D input of a second flip-flop 16. The Q output of the second flip-flop 16 is connected as a third input to the first and second NAND gates 6 and 10 and to a first output line 18. The Q̄ output of the second flip-flop 16 is connected to a second output line 19. A Clear signal input terminal is connected to the Set input of a second flip-flop 16 while the Set input of the first flip-flop 2 is connected to a source of a high level energizing signal +V. Similarly, the Clear inputs of the first and second flip-flops 2 and 16 are connected to the source of the high level energizing signal +V. The Clock input of the first flip-flop 2 is connected to a first clock input terminal 22 while the Clock input of the second flip-flop 16 is connected to a second Clock input terminal 24. The Clock input terminals 22 and 24 may be connected to any suitable source of opposite polarity clock signals, e.g., opposite sides of a clock signal storage flip-flop.

MODE OF OPERATION

The mode of operation of the circuit shown in FIG. 1 is similar to that of the circuit in FIG. 2 with the exception of a latch-up operation produced by the difference in the circuitry of the two signal correlators, as hereinafter described. Accordingly, the following discussion is first directed to the operation of the signal correlator circuit shown in FIG. 1. Overall, the operation of the signal correlator circuit shown in FIG. 1 is directed to a comparison operation of the data signal pulse pairs received over a data transmission line connected to the input terminal 4. Thus, the binary data information is received at the input terminal 4 as pulse pairs either with a positive pulse followed by a negative pulse or a negative pulse followed by a positive pulse representing binary ones and zeros, respectively. In the event that such pulse pairs are not received, e.g., a sequence of positive pulses is received without being separated by negative pulses, the correlator circuit of the present invention is arranged to produce an error signal indicative of a detected error in the reception of data signals on the transmission line. This error signal is represented by a high level output state on output line 19 from the Q output of the second flip-flop 16. An error-free reception, on the other hand, is indicated by a continued low level signal state on the output line 19 from the Q output of the second flip-flop 16. Concurrently, the opposite level state appears on the output line 18 from the Q̄ output of the second flip-flop 16.

Considering first the operation of the correlator circuit, shown in FIG. 1, in the event of a reception of a binary 1 data signal on the transmission line, this data signal is represented by a positive, or high level, pulse followed by a negative, or low level, pulse. The initial high level pulse is applied to the D input of the first flip-flop 2. Shortly thereafter, a clock signal is applied to the Clock input terminal 22 to be applied to the Clock input of the first flip-flop 2. To provide proper synchronization, this clock signal is derived from the data pulses on the transmission line in any suitable manner, e.g., the incoming positive and negative pulses may be counted, delayed and subsequently divided by two to produce a clock signal having a stretched high level state while being delayed past the occurrence of the start of the data input signal pulse. Since the Set and Clear inputs of the flip-flop 2 are connected to the high level signal +V the flip-flop 2 follows the input signal level applied to its D input after the occurrence of the clock pulse.

As a result, the Q output of the first flip-flop 2 is set to a high level state and the $\overline{Q}$ output of the first flip-flop 2 is set to a low level state. These flip-flop output signals are applied, respectively, to the AND gates 7 and 9. Concurrently, the negative pulse of the pulse pair is received over the transmission line connected to the input terminal 4 and is applied to the second AND gate 9 while its logical inverse from the inverter 8 is applied to the first AND gate 7. Consequently, the second AND gate 9 is applied with two low level input signals which are effective to produce a low level output signal from this AND gate. On the other hand, the first AND gate 7 is supplied with a pair of high level signals from the Q output of the first flip-flop 2 and the output of the logical inverter 8. The two high level input signals to the first AND gate 7 are effective to produce a high level output signal from this AND gate, which high level signal is applied to one input of the NOR gate 12 concurrently with the application of the low level output signal from the second AND gate 9 to the other input of the NOR gate 12. Since a high level signal on either one of the two inputs to the NOR gate 12 will determine the output signal from the NOR gate 12, the output signal from the NOR gate 12 switches to a low level signal which is supplied to the D input of the second flip-flop 16. At this time, the $\overline{\text{Clock}}$ signal is applied to the second clock terminal 24 to store this low level input signal in the second flip-flop 16 whereby the $\overline{Q}$ output of the second flip-flop 16 is maintained at a high level state while the Q output of the second flip-flop 16 is maintained at a low level state.

The operation of the correlator circuit of FIG. 1 for the reception of a binary 0 data signal at the input terminal 4 is basically similar to that described above for a binary 1 data signal. Briefly, the initial negative pulse is applied to the D input of the first flip-flop 2 and is effective to produce a high level $\overline{Q}$ output of the first flip-flop 2 and a low level Q output of the first flip-flop 2. These output signals from the first flip-flop 2 are applied to the first and second AND gates 7 and 9 in combination with the subsequent positive pulse half of the binary 0 data pulse pair. Thus, the first AND gate 7 is arranged to have applied thereto a low level signal from the Q output of the flip-flop 2 and a low level output signal from the output of the logical inverter 8. This is effective to produce a low level output signal from the first AND gate 7 for application to the NOR gate 12. Concurrently, the high level pulse from the input terminal 4 is applied directly to the second AND gate 9 in combination with the high level output signal from the $\overline{Q}$ output of the first flip-flop 2. This combination is effective to produce a high level output signal from the second AND gate 9 which is applied to the NOR gate 12. Here again, the application of at least one high level input signal to the NOR gate 12 is effective to produce a low level output signal for application to the D input of a second flip-flop 16. Since this is the same condition that ensued upon the reception of a binary 1 data signal, the output state of the flip-flop 16 is maintained to indicate an error-free reception.

In the event of a reception of an erroneous data transmission line signal at the input terminal 4, as represented by either the reception of a pair of positive pulses or a pair of negative pulses, the correlator circuit of the present invention is arranged to switch the output of the second flip-flop 16 to produce an indication of an error in the data transmission. Using first the example of the reception of a pair of positive pulses, the first positive pulse is stored in the first flip-flop 2 by the application of a clock signal to the clock input of the first flip-flop 2 as previously described. This high level signal is effective to produce a high level Q output from the first flip-flop 2 and a low level output from the $\overline{Q}$ output of the first flip-flop 2. The second positive pulse received at the input terminal 4 is applied to the AND gates 7 and 9 in combination with the output signals from the first flip-flop 2. Thus, the first AND gate 7 is effective to receive a high level input signal from the Q output of the first flip-flop 2 and a low level output signal from the output of the logical inverter 8. This is effective to produce a low level output signal from the first AND gate 7.

Conversely and concurrently, the second AND gate 9 is arranged to receive a high level input signal from the input terminal 4 and a low level output signal from the $\overline{Q}$ output of the first flip-flop 2. This combination is also effective to produce a low level output signal from the second AND gate 9. These two low level output signals are both applied to the NOR gate 12 to produce a high level output signal for application to the D input of the second flip-flop 16. This high level input signal is effective to change the state of the flip-flop 16 upon the occurrence of the Clock pulse applied to the clock input terminal 24 wherein the Q output of the second flip-flop 16 is a high level state and the $\overline{Q}$ output of the second flip-flop 16 is a low level output signal. The low level output signals from the $\overline{Q}$ output of the flip-flop 16 is applied over line 18 as an error indicating output signal and is applied to the Set input of the second flip-flop 16 to continuously produce a suitable Set signal which is effective to latch the second flip-flop 16 in its error indicating condition. This error indicating condition may be selectively removed by the application of a suitable Clear signal to the Clear input terminal. The operation of the correlator of the present invention for the erroneous reception of a pair of negative signals is similar to that described above with a simple substitution of the high and low levels applied to the AND gates 7 and 9. Thus, for either error signal combination occurring on the data transmission line, the correlator of the present invention is effective to produce an output signal indicative of error and to latch its operation into such an error indicating condition.

Referring now to the correlator circuit shown in FIG. 2, the overall operation is basically the same as that described above with respect to the circuit shown in FIG. 1. The basic operative difference occurs as a result of the application of the Q output of the second flip-flop 16 as a third input to the first and second NAND gates 6 and 10. Further, an error indicating state is represented by a low output signal level on the Q output of the second flip-flop 16. An error-free data signal reception is, conversely, represented by the presence of a high level output signal from the Q output of the second flip-flop 16. This Q output signal is applied as one input to both of the three input NAND gate 6 and 10. As previously discussed one of the pair of output signals formed from the first flip-flop 2 output signals and the combination of either an output signal from the inverter 8 or the direct signal from the input terminal 4 is a pair of high level signals while the other is a pair of low level signals. The combination of the high level pair with the normal Q output high level signal is effective to produce a low level output from the respective three-input NAND gate. Concurrently, the low level pair of signals combined with the high level Q output is effective to produce a high level output signal from the other three-input NAND gate. This high and low level output signal combination is applied to the two-input NAND gate 13 to produce a high level output signal from the NAND gate 13 for application to the second flip-flop 16. This high level input signal is effective to maintain the high level Q output signal from the flip-flop 16 to represent an error-free reception.

On the other hand, an erroneous data signal is effective to provide dissimilar level input signals to each of three-input NAND gates 6 and 10 which produces high level output signals from both of those NAND gates. The application of two high level input signals to the third NAND gate 13 is effective to switch its output to a low level signal. This low level signal is gated into the second flip-flop 16 by the clock signal applied to the clock terminal 24. The flip-flop 16 is consequently switched to produce a low level signal on its Q output. This low level output signal is indicative of an error in the data transmission and is applied to both of the three-input NAND gates 6 and 10 to inhibit their further operation since one of their input will now remain as a low level signal to force their output signals to remain high. These high level output signals applied to the two-input NAND gate 13 will force its output to remain as a low level signal to maintain the low level state of the Q output of the second flip-flop 16. A Clear signal can be selectively applied to Set input of the third flip-flop 16 to restore the normal operation in preparation for testing the next pulse pair received over the transmission line at the input terminal 4.

Accordingly, it may be seen that there has been provided, in accordance with the present invention, a signal correlator circuit for checking data signals received over a data transmission line.

The embodiments of the invention in which an exclusive property or privilege is claimed are defined as follows:

1. A correlator comprising:
   an input signal receiving means for receiving pulse pair data signals,
   flip-flop means for storing a first pulse of said pulse pairs, and
   means for comparing a second pulse of said pulse pairs with said stored first pulse of said pulse pairs to detect the presence of an error in the received pulse pairs.

2. A correlator as set forth in claim 1 wherein said means for comparing includes second means for storing a correlator output signal representative of the detected state of said pulse pairs.

3. A correlator as set forth in claim 2 wherein said second means for storing is a second flip-flop.

4. A correlator as set forth in claim 3 wherein said means for comparing includes a first AND gate controlled by input signals from one output side of said first-mentioned flip-flop and from said means for receiving, a second AND gate, signal inverter means connected to said means for receiving, said second AND gate being controlled by input signals from said inverter means and from the other side of said first-mentioned flip-flop and a NOR gate controlled by input signals from said first and second AND gates and supplying an input to said second flip-flop.

5. A correlator as set forth in claim 3 wherein said means for comparing includes a first three-input NAND gate controlled by input signals from one output side of said first-mentioned flip-flop, from said means for receiving and from one output side of said second-mentioned flip-flop, a second NAND gate, signal inverter means connected to said means for receiving, said second AND gate being controlled by input signals from said inverter means, from the other output side of said first-mentioned flip-flop and from the other output side of said second-mentioned flip-flop and a third signal gate controlled by input signals from said first and second NAND gates and supplying an input signal to said second-mentioned flip-flop.

* * * * *